United States Patent
Seo

(10) Patent No.: US 7,199,773 B2
(45) Date of Patent: Apr. 3, 2007

(54) MAGNETIC LIQUID DISPLAY PANEL

(75) Inventor: Jong Wook Seo, Seoul (KR)

(73) Assignee: Hongik University Industry-Academia Cooperation Foundation, Seoul (KR)

(*) Notice: Subject to any disclaimer, the term of this patent is extended or adjusted under 35 U.S.C. 154(b) by 574 days.

(21) Appl. No.: 10/474,675

(22) PCT Filed: Apr. 11, 2002

(86) PCT No.: PCT/KR02/00662

§ 371 (c)(1),
(2), (4) Date: Mar. 5, 2004

(87) PCT Pub. No.: WO02/084386

PCT Pub. Date: Oct. 24, 2002

(65) Prior Publication Data

US 2004/0150614 A1 Aug. 5, 2004

(30) Foreign Application Priority Data

Apr. 11, 2001 (KR) .............................. 2001-19261

(51) Int. Cl.
*G09G 3/34* (2006.01)

(52) U.S. Cl. ........................ 345/86; 345/62; 345/107; 345/111; 359/296

(58) Field of Classification Search ............ 345/60–62, 345/86, 111, 107; 359/5, 296
See application file for complete search history.

(56) References Cited

U.S. PATENT DOCUMENTS

| 3,863,249 A | | 1/1975 | Olah |
| 4,076,387 A | * | 2/1978 | Haas et al. .................. 359/296 |
| 4,528,932 A | * | 7/1985 | Ducza et al. ................ 116/204 |
| 5,912,652 A | | 6/1999 | Seo |
| 6,118,426 A | * | 9/2000 | Albert et al. ................ 345/107 |
| 6,362,807 B1 | * | 3/2002 | Baba et al. .................. 345/107 |
| 2002/0018044 A1 | * | 2/2002 | Yasuda ........................ 345/111 |

FOREIGN PATENT DOCUMENTS

EP 0 633 488 7/1994

* cited by examiner

Primary Examiner—Richard Hjerpe
Assistant Examiner—Kimnhung Nguyen
(74) Attorney, Agent, or Firm—Leydig, Voit & Mayer, Ltd.

(57) ABSTRACT

A magnetic display panel includes strips of first electrodes arranged in a first direction on an inner surface of a rear plate. Strips of second electrodes are arranged in a second direction, perpendicular to the first electrodes, and insulated from the first electrodes. Pixel electrodes are installed on each of the intersections of the first and second electrodes, and each has a spiral magnetic field producing unit electrically connected to the first and second electrodes. A magnetic film on the pixel electrodes has a magnetic gap through which a magnetic field produced by the pixel electrodes leaks. A magnetic fluid has a predetermined thickness on the inner surface of the rear plate. Such a display panel can provide moving pictures because of its improved responsivity, and, particularly, is easily fabricated at a low cost in large quantities because of its simple structure. Furthermore, the display panel is advantageous in building super-large display devices based on multiple integration.

16 Claims, 16 Drawing Sheets

IMAGE DATA

MAGNETIC LIQUID DISPLAY PANEL

TECHNICAL FIELD

The present invention relates to the field of magnetic liquid display panels, and more particularly, to a magnetic liquid display panel that has a high responsivity and is easily manufactured.

BACKGROUND ART

Display devices have been developed from cathode ray tubes (CRTs) using an accelerated electronic beam to plasma display panels (PDPs) based on plasma discharge, and liquid crystal displays (LCDs) using liquid crystal having an electro-optical effect. Besides, there are vacuum fluorescent displays (VFDs) using an electronic beam accelerated at a low speed, electro luminescent displays (ELDs), and magnetic liquid display panels. These display devices are classified into an active display device, which radiates light by itself, and an inactive luminescent display device, which requires a light source because the display device cannot emit light by itself.

LCDs, which are recently used for laptop computers, are representative of inactive luminescent display devices, are compact and light and consume a small amount of power. Accordingly, LCDs are widely used in compact electronic products as well as lap-top computers. Such LCDs have the above-mentioned merits, but also have the demerit that its manufacturing process is complicated due to the use of liquid crystal. In particular, in order that air bubbles do not remain on a liquid crystal layer existing between a front plate and a rear plate, which are a predetermined distance apart from each other, liquid crystal injection is performed by a complicate vacuum injection method using a differential vacuum pressure. The cavities of unit LCDs must be isolated from one another by partitions with certain widths in order to receive liquid crystal injected in a vacuum environment by the above-mentioned vacuum injection. Accordingly, when a large-screen display device is manufactured with several unit LCDs, the junction portion between adjacent unit LCDs occupies a significantly large effective area because of the partitions with certain widths. This degrades the continuity of an image on the unit LCDs. Also, LCDs must be formed of a material endurable against high heat since they undergo a high-temperature process. In addition, a complicated manufacturing process makes it difficult to produce large LCDs.

Like LCDs, magnetic liquid display panels are also classified into a non-emissive display device. As well known, magnetic fluid (ferromagnetic fluid) is a suspension in which superfine ferromagnetic particles are stably dispersed within a liquid. The ferromagnetic particles are not separated from the liquid under a general centrifugal force or a general magnetic field. A magnetic fluid is a magnetic colloid, which operates like having a magnetism within a magnetic field. The type of Magnetic fluids includes oxide magnetic fluid and metallic magnetic fluid. An example to which such magnetic fluid is applied is disclosed in European Patent No. 0633488 A1, in which a display panel adopts a principle similar to that of existing LCDs.

To be more specific, as shown in FIG. 1, magnetic fluid 4 is interposed between a front plate 1 and a rear plate 2. a plurality of magnetic field coils 3 for applying a magnetic field to the magnetic fluid 4, in which geometrically anisotropic magnetic particles are dispersed, are installed behind the rear plate 2. the magnetic field coils 3 are coupled to a display controller 5 for driving the magnetic field coils. The magnetic field coils 3 are also provided in a structure where loop-shaped patterns stacked on a multi-layered substrate are connected to one another by through holes. In such a display panel, as shown in FIG. 2, the magnetic particles at portions ON, which are supposed to transmit light 6, are aligned by the application of a magnetic field to the portions ON, thus transmitting light. Meanwhile, portions OFF, in which magnetic particles are naturally scattered, are supposed to absorb or block light.

However, it is extremely difficult for the magnetic particles in the magnetic fluid used in such a conventional display panel have geometric anisotropy in a superfine state. Also, light control based on the alignment or non-alignment of magnetic particles is not smooth. In addition, the magnetic field coils 3 for applying a magnetic field to magnetic fluid must be formed in a multi-layered structure, thus requiring a very complicated manufacturing process.

In a magnetic fluid display panel disclosed in U.S. Pat. No. 3,863,249, instead of using the alignment or nonalignment of magnetic fluid, light transmission is blocked or allowed depending on the presence or absence of magnetic fluid within a light transmission area due to the movement of magnetic fluid by a magnetic force. However, this magnetic fluid display panel requires a strong magnetic field to move magnetic fluid, and accordingly requires high energy. Also, the magnetic fluid display panel is very inferior in terms of pixel switching responsivity of the magnetic fluid, hence it is not suitable to form moving pictures. In addition, since the magnetic fluid display panel adopts magnetic coils as a magnetic field forming unit, the miniaturization of cells, and mass-production are difficult, and the manufacturing costs are high.

The inventor of the present invention has proposed a new magnetic fluid display panel through U.S. Pat. No. 5,912, 652, in order to overcome the defects of such conventional magnetic display panels.

The aforementioned magnetic display panel can provide moving pictures with a fast responsivity, and also can be easily manufactured at a low cost in large quantities because of its simple structure. Furthermore, this magnetic display panel is significantly advantageous in the construction of super-large display devices by multiple integration. The present invention provides a magnetic display panel improved in performance based on such a magnetic display panel described above.

DISCLOSURE OF THE INVENTION

A first object of the present invention is to provide a display panel capable of providing moving pictures with an increased responsivity.

A second object of the present invention is to provide a magnetic display panel that can be easily manufactured at a low cost in large quantities because of the simplicity of its structure.

A third object of the present invention is to provide a magnetic display panel that is advantageous in constituting a super-large display device based on multiple integrations.

In order to achieve the above objects of the present invention, there is provided a magnetic display panel according to an aspect of the present invention. In this magnetic display panel, front and rear plates keep a predetermined distance from each other. Strips of first electrodes are arranged in the first direction on the inner surface of the rear plate. Strips of second electrodes are arranged in the direction perpendicular to the first electrodes while being insulated from the first electrodes. Pixel electrodes are each installed on the intersection of a first electrode and a second electrode, and each has a spiraled magnetic field producing unit electrically connected to the first and second electrodes. An upper magnetic film is formed on the pixel electrodes, and has a magnetic gap through which a magnetic field produced by the pixel electrodes leaks. Magnetic fluid is formed to a predetermined thickness on the inner surface of the rear plate.

Preferably, the upper magnetic film is formed of a soft magnetic material. It is also preferable that each of the pixel electrodes has a plurality of magnetic field producing units electrically connected to one another.

Preferably, 2 magnetic gaps for each magnetic field producing unit are formed in the upper magnetic film, and each of the magnetic gaps is formed halfway between the center of a magnetic field producing unit and either lateral side of the magnetic field producing unit.

Also, preferably, a magnetic shield layer, which corresponds to a lower magnetic film, is formed of one of a soft magnetic material and a ferromagnetic material under the pixel electrodes. Furthermore, it is preferable that the magnetic shield layer and the upper magnetic film form a closed-loop-shaped magnetic circuit.

In order to achieve the above objects of the present invention, there is provided a magnetic display panel according to another aspect of the present invention. In this magnetic display panel, front and rear plates keep a predetermined distance from each other. Strips of first electrodes are arranged in the first direction on the inner surface of the rear plate. Strips of second electrodes are arranged in the direction perpendicular to the first electrodes while being insulated from the first electrodes. Pixel electrodes are each installed on the intersection of a first electrode and a second electrode, and each has a spiraled magnetic field producing unit electrically connected to the first and second electrodes. A lower magnetic film is formed on the pixel electrodes, and has a magnetic gap through which a magnetic field produced by the pixel electrodes leaks. An upper magnetic film is formed of a ferromagnetic material over the lower magnetic film. Magnetic fluid is formed to a predetermined thickness on the inner surface of the rear plate.

Preferably, the lower magnetic film is formed of a soft magnetic material. It is also preferable that each of the pixel electrodes has a plurality of magnetic field producing units electrically connected to one another.

Preferably, 2 magnetic gaps for each magnetic field producing unit are formed in the upper magnetic film, and each of the magnetic gaps is formed halfway between the center of a magnetic field producing unit and either lateral side of the magnetic field producing unit.

Preferably, a magnetic shield layer is formed under the pixel electrodes. Furthermore, it is preferable that the magnetic shield layer and the upper magnetic film form a closed-loop-shaped magnetic circuit.

BEST MODE FOR CARRYING OUT THE INVENTION

Figure 1:
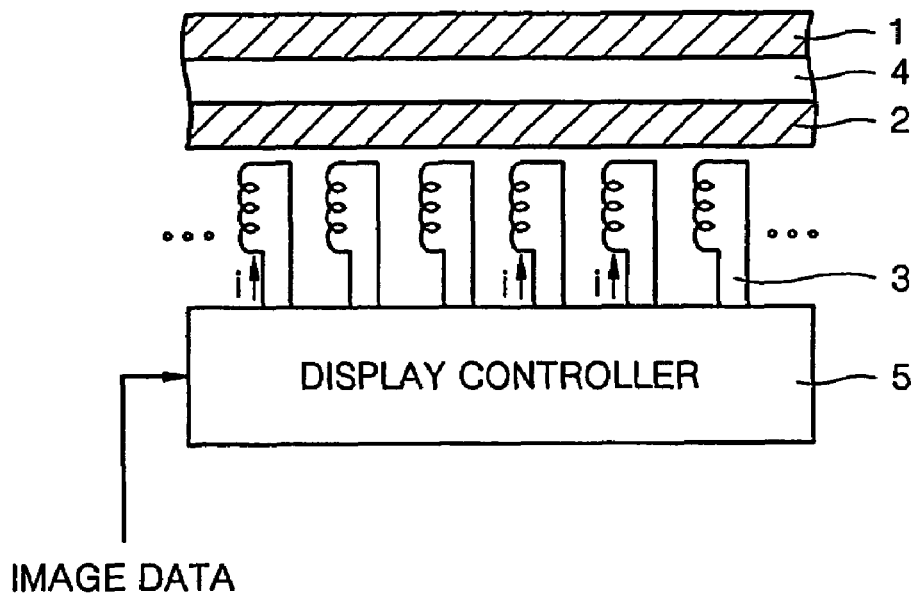
FIGS. 1 and 2 are schematic block diagrams of a conventional display panel using magnetic fluid.
Figure 2:
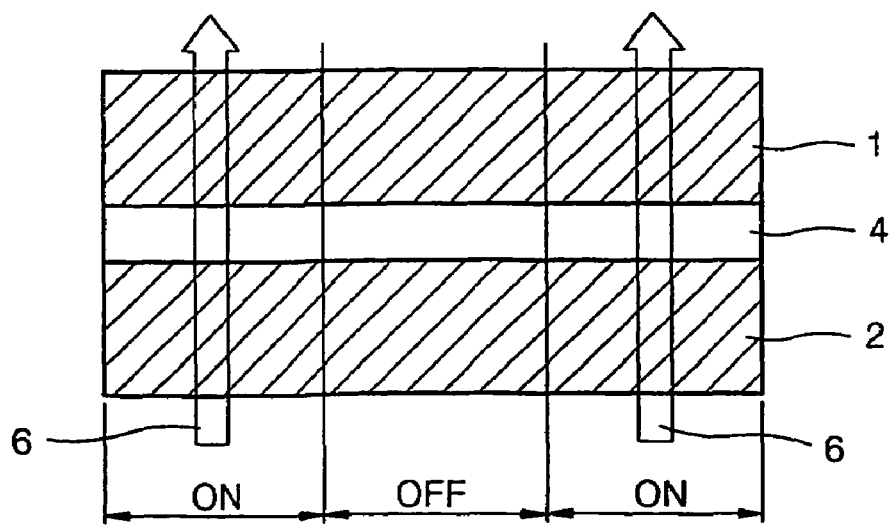
Figure 3:
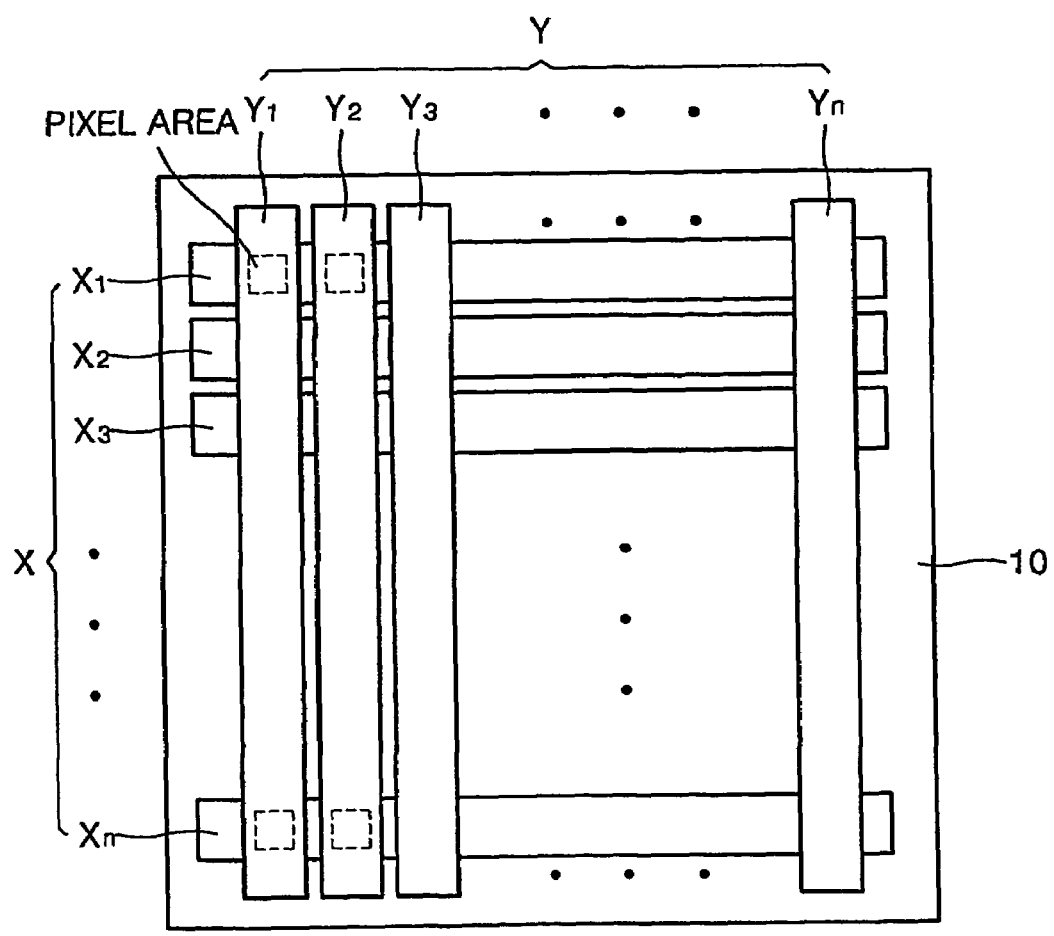
FIG. 3 is a schematic plan view of the configuration of first and second electrodes formed on a rear plate in a magnetic display panel according to the present invention.
Figure 4:
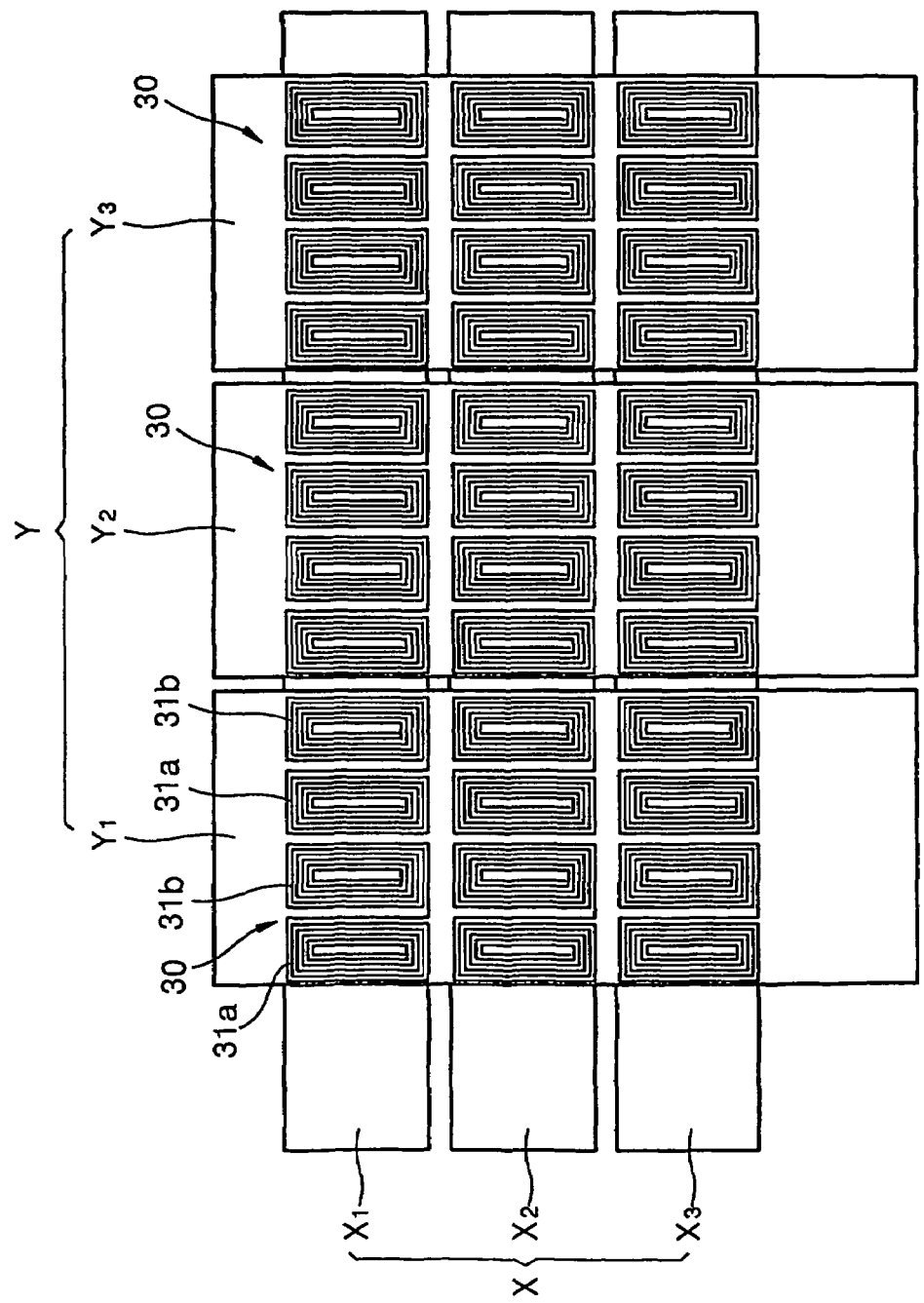
FIG. 4 is a schematic enlarged plan view of pixel electrodes installed on a pixel area on which first and second electrodes intersect at right angles, in the magnetic display panel of FIG. 3.
Figure 5:
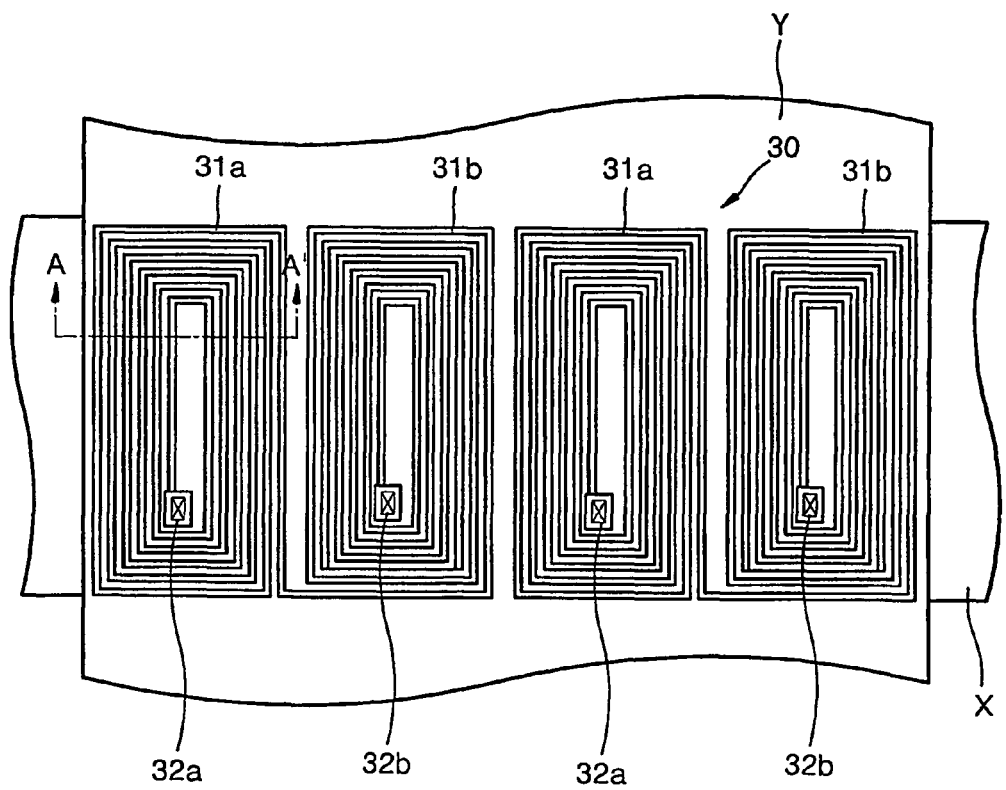
FIG. 5 is a schematic enlarged plan view of a pixel electrode in the magnetic display panel of FIG. 4.

In FIG. 3, first electrodes $X_1$ through $X_n$ (hereinafter, referred to as X) and second electrodes $Y_1$ through $Y_n$ (hereinafter, referred to as Y) are arranged on a rear plate 10 in a magnetic display panel according to the present invention. FIG. 4 enlarges and shows pixel electrodes 30 formed on pixel areas on which the first and second electrodes X and Y intersect at right angles are shown. FIG. 5 enlarges and shows a pixel electrode 30.

As shown in FIGS. 3 and 4, the first electrodes X are arranged in a row on the rear plate 10 at a predetermined interval, while the second electrodes Y lie at right angles to the first electrodes X. Accordingly, the first and second electrodes X and Y establish an X-Y matrix structure as that used in general flat display devices.

The first and second electrodes X and Y are electrically insulated from one another, and the pixel electrodes 30, which are the feature of the present invention, are formed on the pixel areas where the first and second electrodes X and Y intersect. In FIGS. 4 and 5, a pixel electrode 30 has four magnetic field producing units 31a and 31b spiraled in a rectangular shape, among which every two magnetic field producing units 31a and 31b form a group and are electrically connected to each other in series. Here, the magnetic field producing units 31a and 31b are electrically insulated from the first and second electrodes X and Y by an unshown insulating layer. However, only the ends 32a and 32b of the magnetic field producing units 31 and 31b are electrically connected to the first and second electrodes X and Y through an unshown hole penetrating the insulating layer. Such a connection structure will be described in detail later.

The magnetic field producing units 31a and 31b in each of the pixel electrodes 30 are connected to the first and second electrodes X and Y to produce a magnetic field using an operation voltage received through the first and second electrodes X and Y.

As described above, each of the pixel electrodes 30 may have a plurality of magnetic field producing units, for example, four magnetic field producing units 31a, 31b, 31a and 31b shown in FIGS. 4 and 5, but it may have a single magnetic field producing unit in some cases. According to the present invention, the number of magnetic field producing units for each pixel electrode 30 is not limited and can vary according to design conditions. Also, when a plurality of magnetic field producing units are provided for each of the pixel electrodes 30, they can be individually connected to the first and second electrodes X and Y. Alternatively, as described above, two adjacent magnetic field producing units 31a and 31b for one group are electrically connected to each other, and each group with both ends 32a and 32b can be connected to the first and second electrodes X and Y. A magnetic display panel according to a first embodiment of the present invention will now be described, based on the structure in which two magnetic field producing units 31a and 31b for each group are electrically connected to each other.

Figure 6:
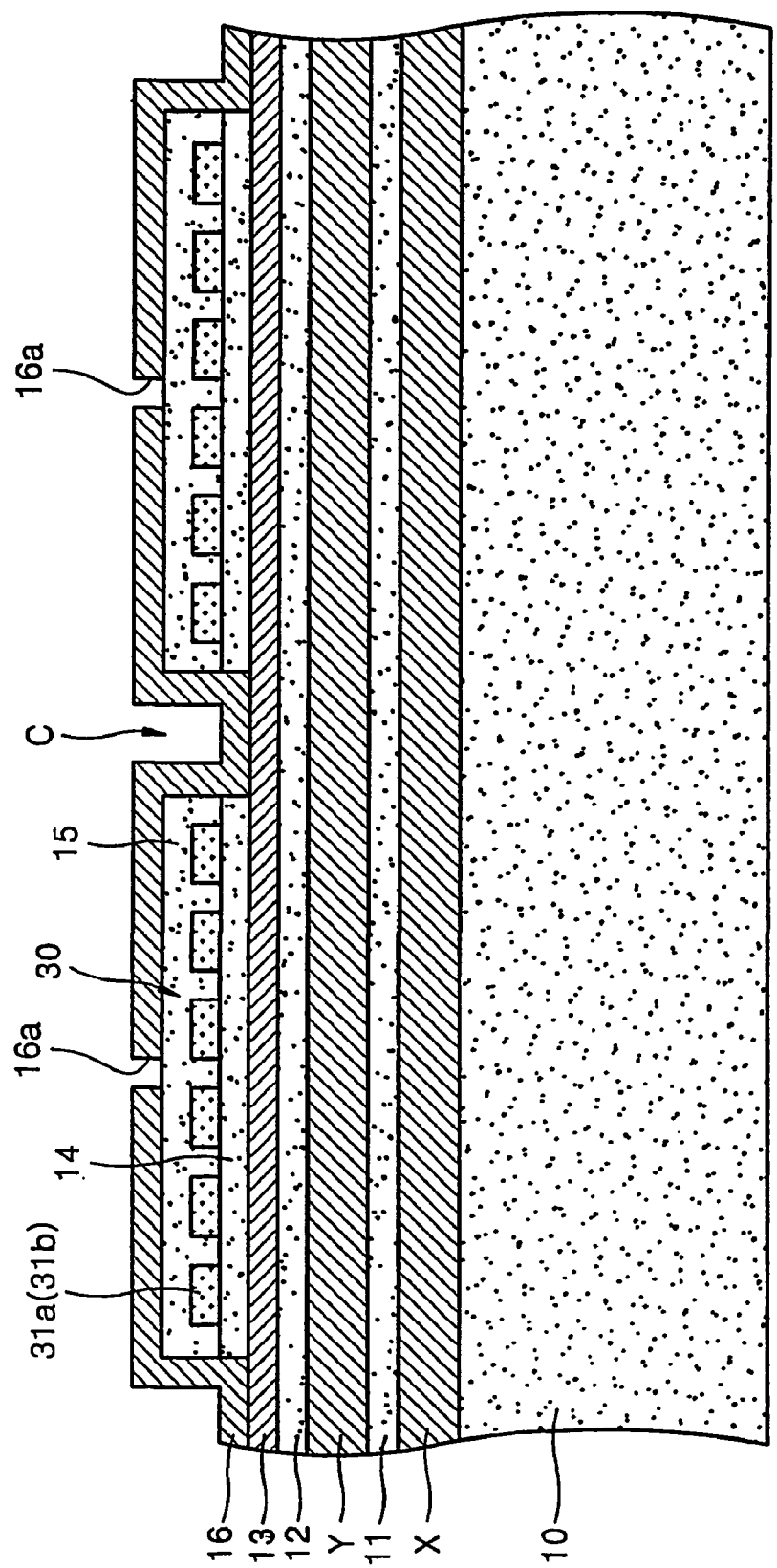
FIG. 6 is a partial cross-section of a magnetic display panel according to a first embodiment of the present invention, taken along line VI—VI of FIG. 5.

FIG. 6 is a cross-section of part of a magnetic display panel according to a first embodiment of the present invention, taken along line VI—VI of FIG. 5. In FIG. 6, a magnetic field producing unit having layers deposited one on another at its upper and lower sides is shown.

Referring to FIG. 6, the first and second electrodes X and Y are formed on the rear plate 10, while a first insulating layer 11 is interposed between the first and second electrodes X and Y. A second insulating layer 12 is formed on the second electrodes Y, and a lower magnetic film, that is, a magnetic shield layer 13, is formed of a soft magnetic material on the second insulating layer 12. The magnetic shield layer 13 and an upper magnetic film 16 can be formed of a hard magnetic material. However, preferably, they are formed of a soft magnetic material.

A third insulating layer 14 is formed on the magnetic shield layer 13, and magnetic field producing units 31a and 31b, which form a pixel electrode 30, are formed on the third insulating layer 14. A fourth insulating layer 15 is formed on a magnetic field producing unit 31a/31b. The upper magnetic film 16 is formed of a hard magnetic material, or, preferably, a soft magnetic material, on the top of the resulting layered structure. The upper magnetic film 16 contacts the magnetic shield layer 13 at the portions unoccupied by the magnetic field producing unit 31a/31b, thus constituting a magnetic circuit shaped of a closed loop. A magnetic gap 16a having no upper magnetic film 16 is formed in the middle of the center C of the magnetic field producing unit 31a and either of its periphery. In other words, the magnetic gap 16a is formed at the portion providing the strongest magnetic field, out of the entire portion of the magnetic field producing unit 31a/31b spiraled in a rectangular shape. The upper magnetic film 16 directly contacts magnetic fluid. Although the connection mechanism for connecting the magnetic field producing unit 31a/31b to the first and second electrodes X and Y is not shown in FIG. 6, a through hole is formed on the lower part of the magnetic field producing unit 31a/31b, through which the magnetic field producing unit 31a/31b is electrically connected to the first and second electrodes X and Y. This connection mechanism can be easily formed by a general technique, hence it does not limit the scope of the present invention.

Figure 7:
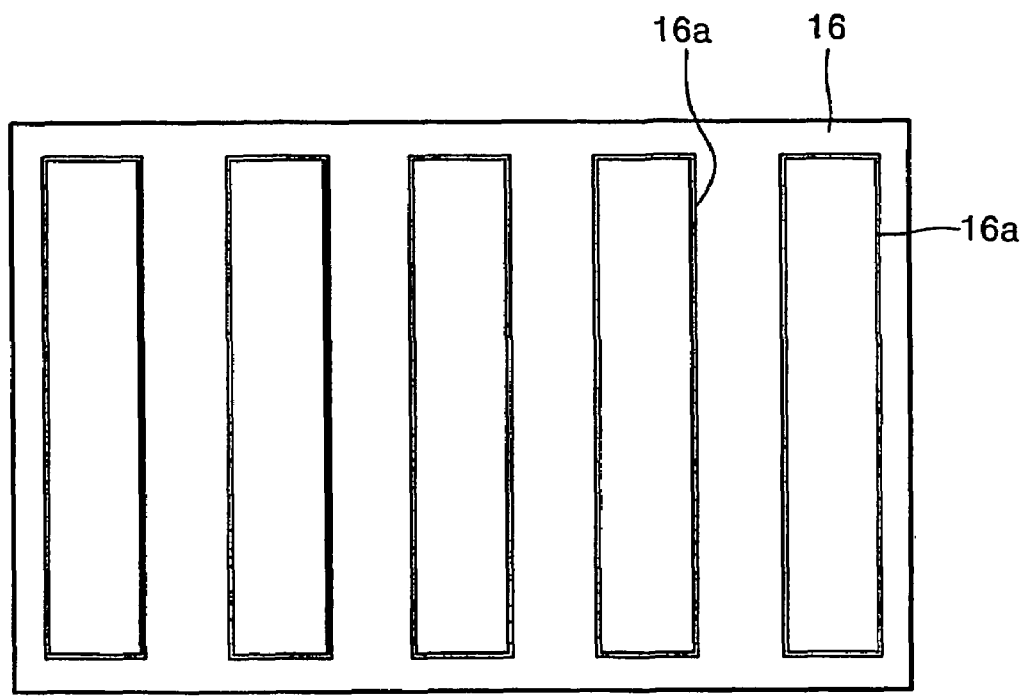
FIG. 7 is a plan view of a magnetic gap formed on an upper magnetic film in the magnetic display panel according to the first embodiment of the present invention.

FIG. 7 is a plan view of the upper magnetic film 16 of FIG. 6. As shown in FIG. 7, the magnetic gap 16a, which is in a rectangular shape corresponding to the shape of the magnetic field producing unit 31a, is formed on the upper magnetic film 16.

Figure 8:
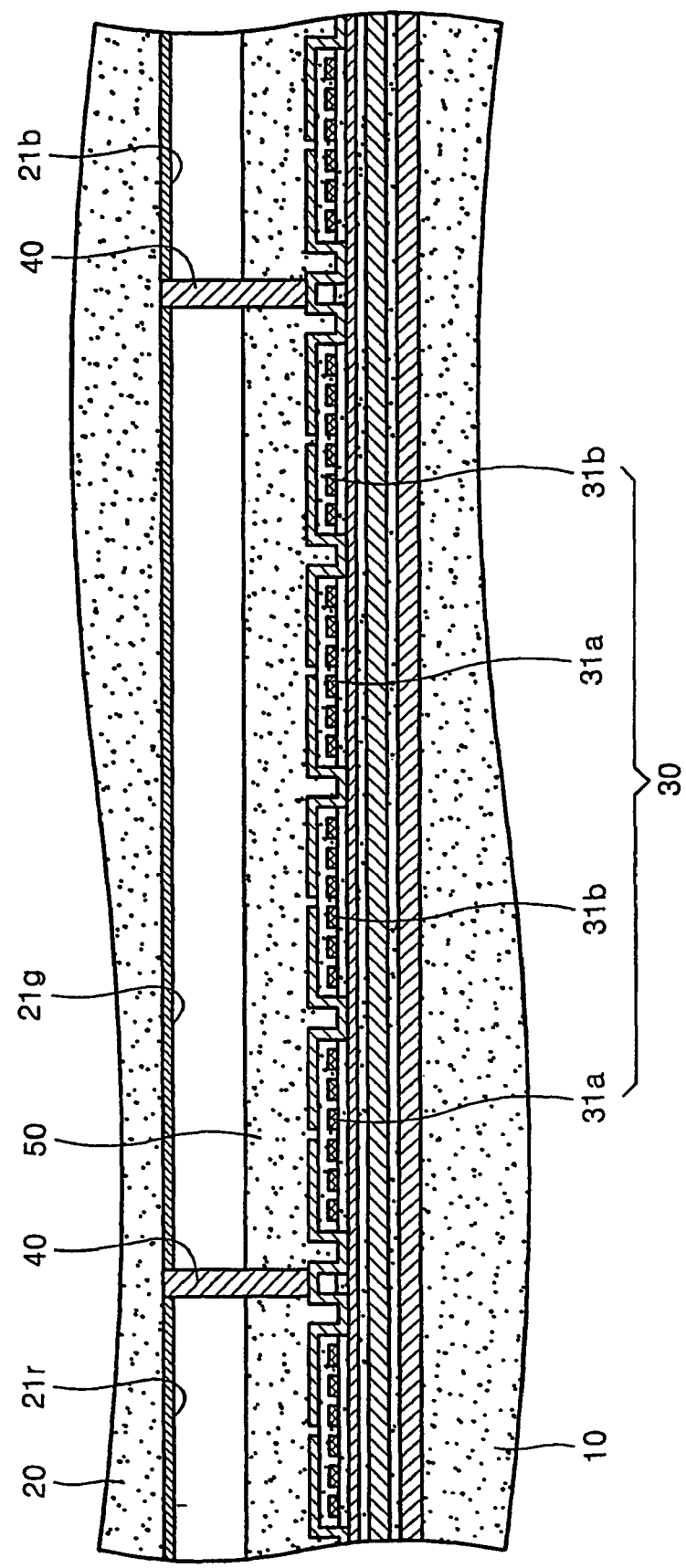
FIG. 8 is a schematic cross-section of the magnetic display panel according to the first embodiment of the present invention.

FIG. 8 is a schematic cross-section of the magnetic display panel of FIG. 6, in which a front plate has been combined with the rear plate 10. A spacer 40 stands on the rear plate 10 to support the front plate 20 while interposing between adjacent pixel electrodes 30, such that a space for receiving magnetic fluid 50 is provided between the front and rear plates 20 and 10. The magnetic fluid 50 is located on the inner surface of the rear plate 10, to be more specific, on the upper magnetic film 16. Meanwhile, color filters 21r, 21g and 21b for realizing color pictures are formed on the inner surface of the front plate 20.

In such a structure of a magnetic display panel according to the present invention, when a strong magnetic field is produced on a magnetic gap by magnetic field producing units, most incident light is reflected by the magnetic field, or when there is no magnetic field, most incident light is absorbed by magnetic fluid. In this way, images are displayed.

Figure 9A:
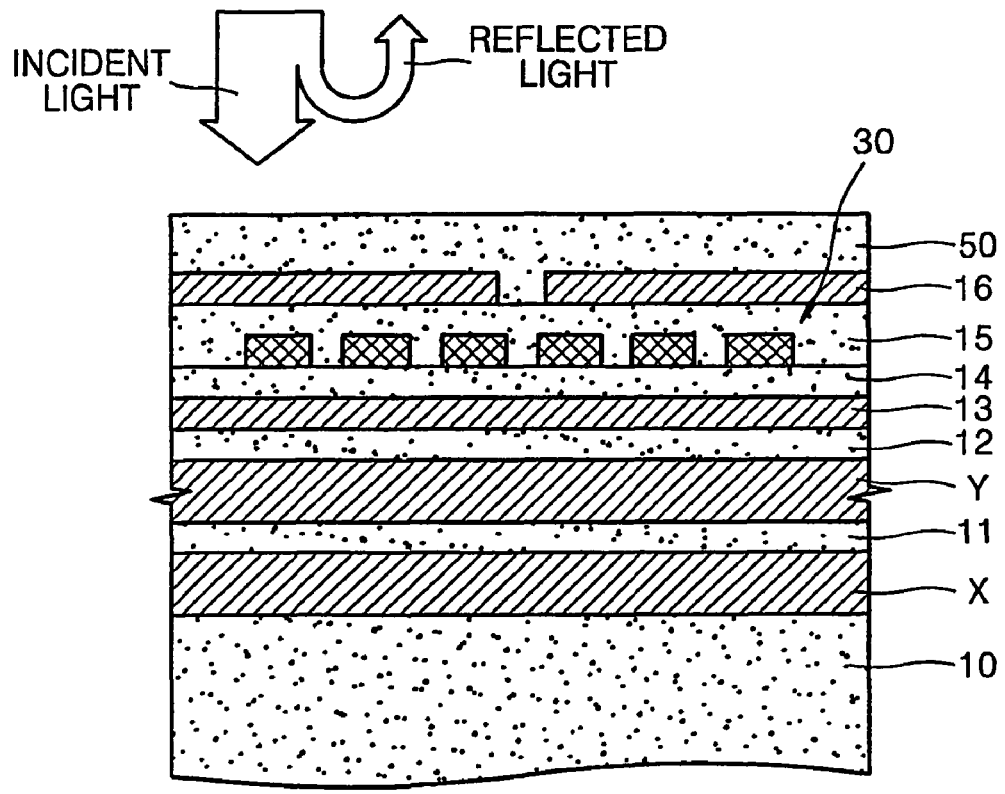
FIGS. 9A and 9B are cross-sectional views for explaining the ON and OFF states of pixels in the magnetic display panel according to the first embodiment of the present invention.
Figure 9B:
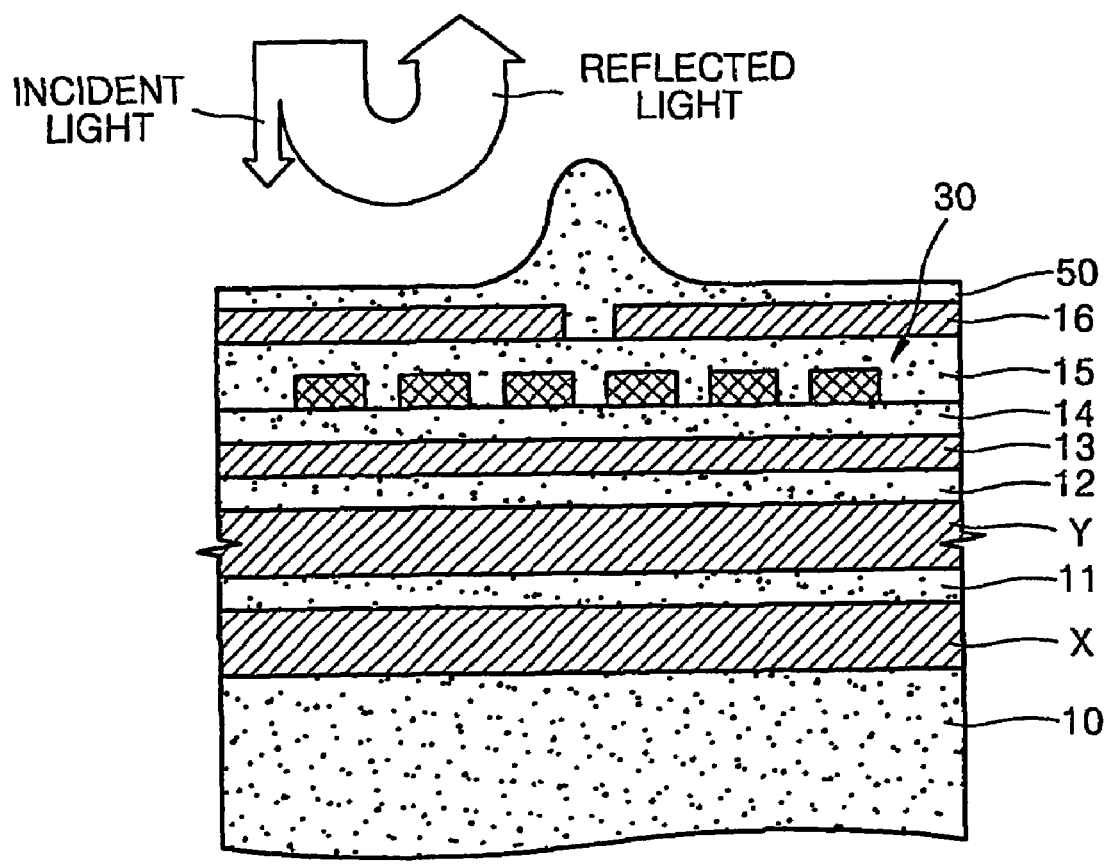

FIG. 9A shows the state of the magnetic display panel of FIG. 8 when no magnetic field is produced by magnetic field producing units. FIG. 9B exaggeratedly shows the state of the magnetic display panel of FIG. 8 when a magnetic field is produced by magnetic field producing units.

As shown in FIG. 9A, when there is no magnetic field produced by magnetic field producing units, the magnetic fluid 50 is formed to a uniform thickness over the entire surface of the upper magnetic film 16 by surface tension. Accordingly, only some of incident light is reflected, whereas the rest is absorbed by the magnetic fluid 50. This cases denotes that pixels are in an OFF state, that is, are in a dark state.

As shown in FIG. 9B, while magnetic fields are produced by magnetic field producing units, strong magnetic fields are collected at the magnetic gap 16a, and accordingly the magnetic fluid 50 is collected at the magnetic gap 16a while it exists very thinly on the area other than the magnetic gap 16a. Hence, most incident light is reflected by the upper magnetic film 16, while only some incident light is absorbed by the magnetic fluid 50. Thus, this case represents that pixels are in an ON state, that is, are in a bright state. The ON state of pixels is maintained only while current is being applied to the magnetic field producing units. However, when the supply of current to the magnetic field producing units is stopped, the magnetic fluid immediately spreads to the entire surface of an upper magnetic film by a surface tension.

Such an ON-OFF mechanism of pixels is similar to the ON-OFF mechanism of general liquid crystal displays. The ON-OFF mechanism of pixels controls the amount of reflection of incident light, and, accordingly, color picture display can be achieved by light beams with wavelengths selected by color filters installed in front of a front plate.

The amount of movement of magnetic fluid depends on the amount of current supplied to the pixel electrodes. This enables controlling of the reflective rate of incident light, so that the gray scale can be expressed.

Figure 10:
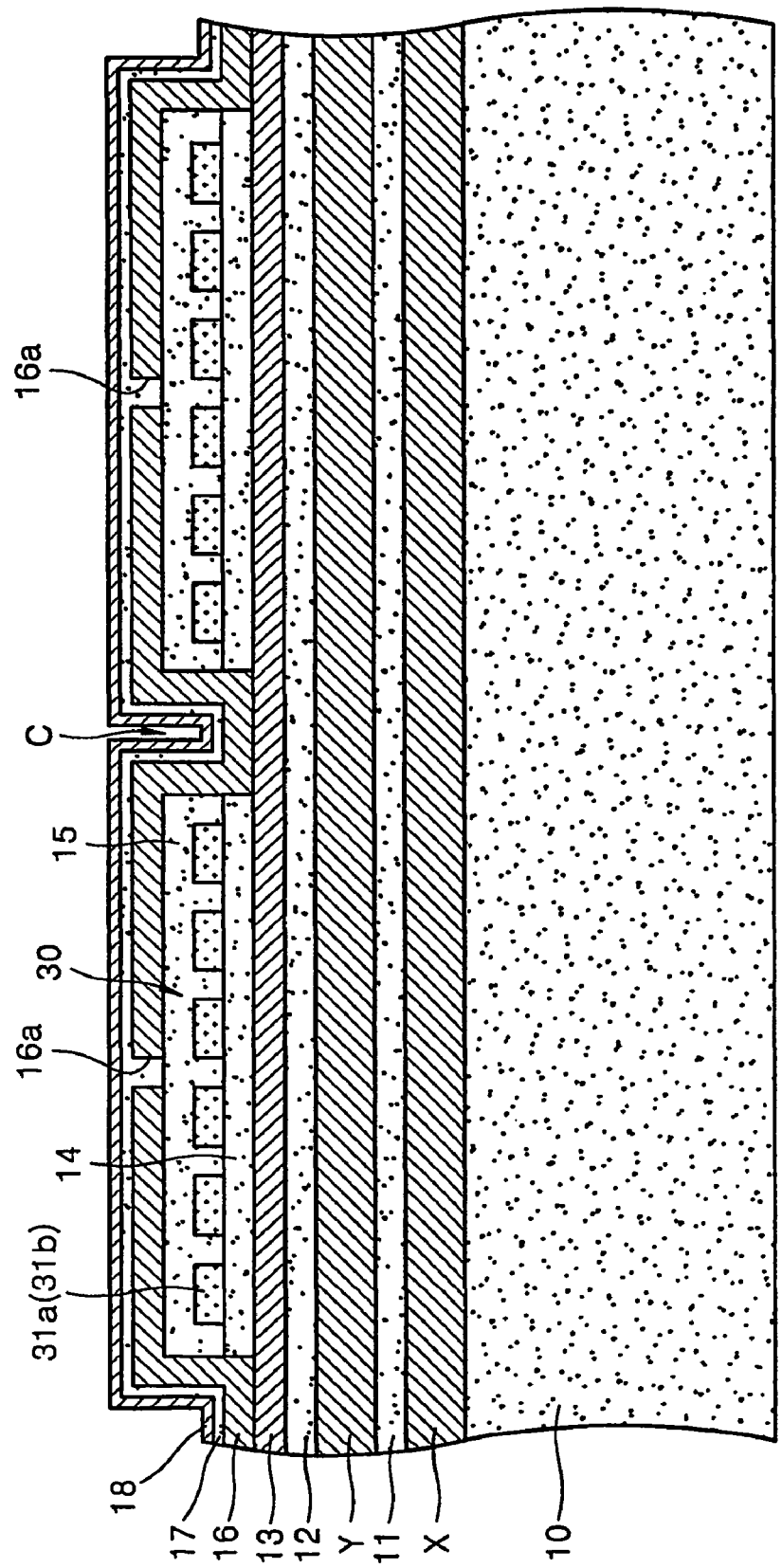
FIG. 10 is a schematic cross-section of a multi-layered structure formed on a rear plate in a magnetic display panel according to a second embodiment of the present invention.

FIG. 10 is a partial cross-section of a stacked structure formed on a rear plate 10 in a magnetic display panel according to the second embodiment of the present invention, in which a ferromagnetic film 18 for self memory is formed over the upper magnetic film 16. Referring to FIG. 10, first and second electrodes X and Y are formed on the rear plate 10, while a first insulating layer 11 sandwiches between the first and second electrodes X and Y. A second insulating layer is formed on the second electrode Y, and a lower magnetic film, that is, a magnetic shield layer 13, is formed of a soft or hard magnetic material on a second insulating layer 12.

A third insulating layer 14 is formed on the magnetic shield layer 13, and the magnetic field producing units 31a and 31b, which form a pixel electrode 30, are formed on the third insulating layer 14. A fourth insulating layer 15 is formed on a magnetic field producing unit 31a/31b. An upper magnetic film 16 is formed of a hard or soft magnetic material on the top of the resulting stacked structure. The upper magnetic film 16 contacts the magnetic shield layer 13 at the portions unoccupied by the magnetic field producing unit 31a/31b, thus constituting a magnetic circuit shaped of a closed loop. A magnetic gap 16a having no upper magnetic film 16 is formed in the middle of the center C of the magnetic field producing unit 31a/31b and either of its periphery. In other words, the magnetic gap 16a is formed at the portion providing the strongest magnetic field, out of the entire portion of the magnetic field producing unit 31a/31b spiraled in a rectangular shape.

A fifth insulating layer 17 is formed on the upper magnetic film 16, and a ferromagnetic film 18, which is the feature of the present invention, is formed on the fifth insulating layer 17. The ferromagnetic film 18, which contacts magnetic fluid, is magnetized together with the magnetic fluid when magnetic fields are produced by the magnetic field producing units 31a and 31b. The ferromagnetic film 18 also provides a so-called memory function of pixels by maintaining a magnetic force for a certain period of time by virtue of its ferromagnetism regardless of whether magnetic fields are produced by the magnetic field producing units 31a and 31b. Hence, without need for continuous application of current to the magnetic field producing units 31a and 31b for achieving the ON/OFF of pixels, current can be applied only for the duration required to magnetize the ferromagnetic film to a required intensity.

In order to erase the information memorized by the ferromagnetic film 18 from a pixel, that is, to refresh the pixel, the erasing magnetic field with respect to the ferromagnetic film 18 must be produced by the magnetic field producing units 31a and 31b. The polarity of the erasing magnetic field for the ferromagnetic film is inverted as in a general degaussing process, and sinusoidal reducing current, whose intensity decreases, is applied to the magnetic field producing units 31a and 31b.

In FIG. 10, although the connection mechanism for connecting the magnetic field producing unit 31a/31b to the first and second electrodes X and Y is not shown, a through hole is formed on the lower part of the magnetic field producing unit 31a/31b, through which the magnetic field producing unit 31a/31b is electrically connected to the first and second electrodes X and Y. Such a connection mechanism can be easily formed by a general technique, as mentioned above in the description of the first embodiment. Hence, it does not limit the scope of the present invention.

Figure 11:
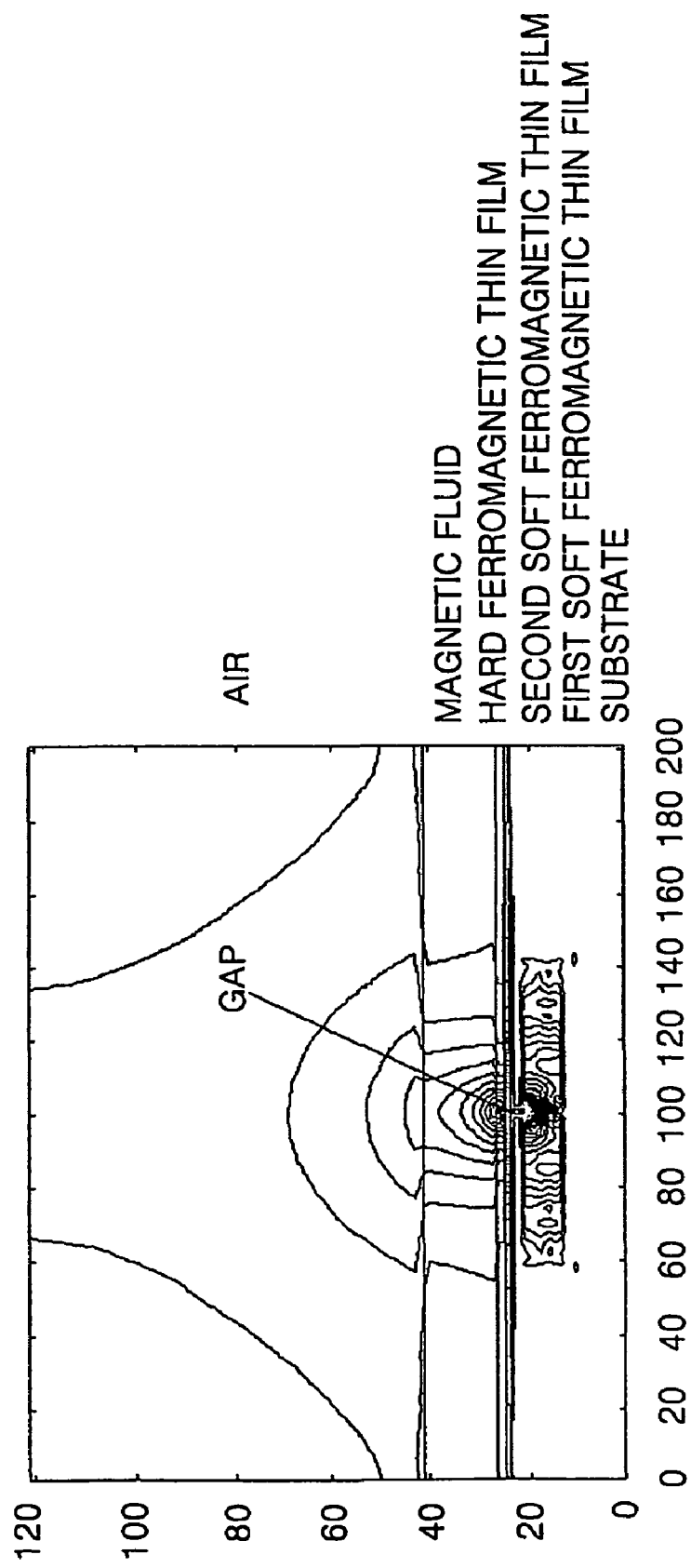
FIG. 11 shows a computer simulation showing a magnetic field distributed in a magnetic field production unit in the magnetic display panel of FIG. 10.

FIG. 11 shows the distribution of a magnetic field in a magnetic field production unit through a computer simulation performed on the magnetic display panel of FIG. 10. Referring to FIG. 11, it can be seen that a magnetic field is produced around a magnetic field producing unit by the application of current to the magnetic field producing unit, while a very strong magnetic field is concentrated on the magnetic gap of an upper magnetic film, through which magnetism leaks. It can also be seen that a lower magnetic film, that is, a magnetic shield layer, shields the magnetic field below the magnetic gap from spreading toward a substrate. The magnetic shield layer is provided to prevent the magnetic field in a pixel electrode from disturbing by an external magnetic field. As a result, magnetic fluid is gathered around the magnetic gap where a magnetic field is gathered, resulting in a shape as shown in FIG. 9B. Thus, most incident light beams are reflected.

Such a magnetic display panel according to the present invention can be fabricated by a well-known photolithographic technique.

A process for fabricating a magnetic display panel according to the present invention will now be described with reference to FIGS. 12A through 12K schematically showing only a magnetic field producing unit for convenience of explanation.

Figure 12A:
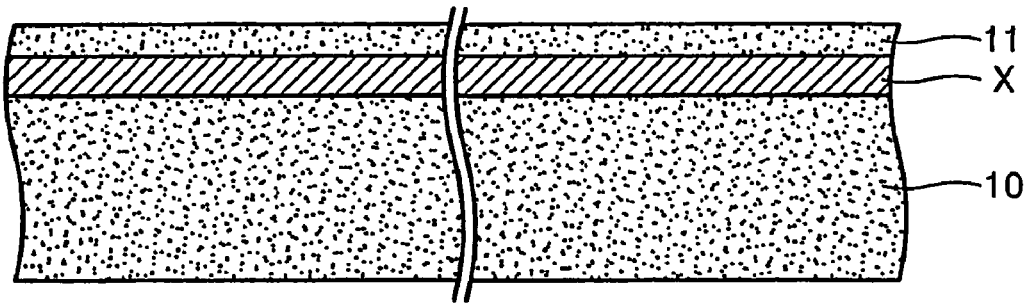
FIGS. 12A through 12K are cross-sectional views for illustrating a rear plate formation process in the manufacture of a magnetic display panel according to the present invention.

As shown in FIG. 12A, a plurality of first electrodes X are arranged side by side in the first direction on a rear plate 10. Next, a first insulating layer 11 is formed to a predetermined thickness on the first electrodes X.

Figure 12B:
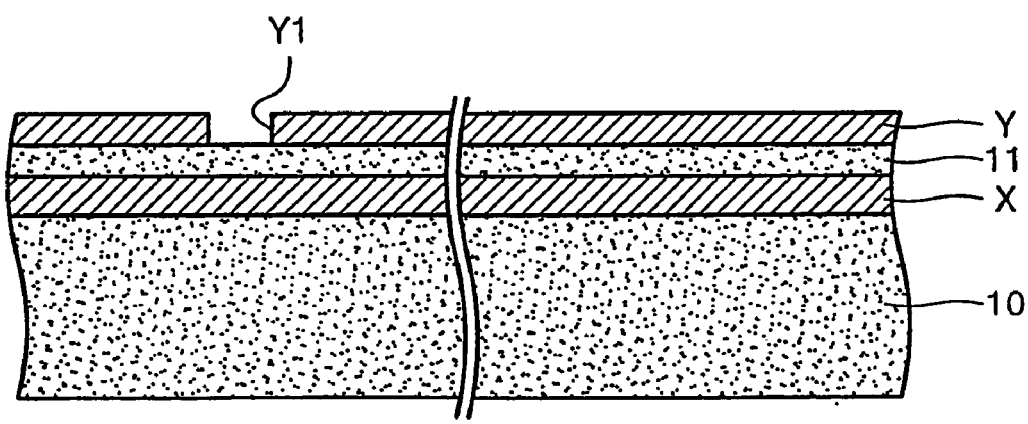

As shown in FIG. 12B, a plurality of second electrodes Y are arranged side by side in the second direction perpendicular to the first direction, on the first insulating layer 11. At this time, a through hole Y1 for allowing a magnetic field producing unit to contact a first electrode X and preventing short-circuit is formed in a second electrode Y.

Figure 12C:
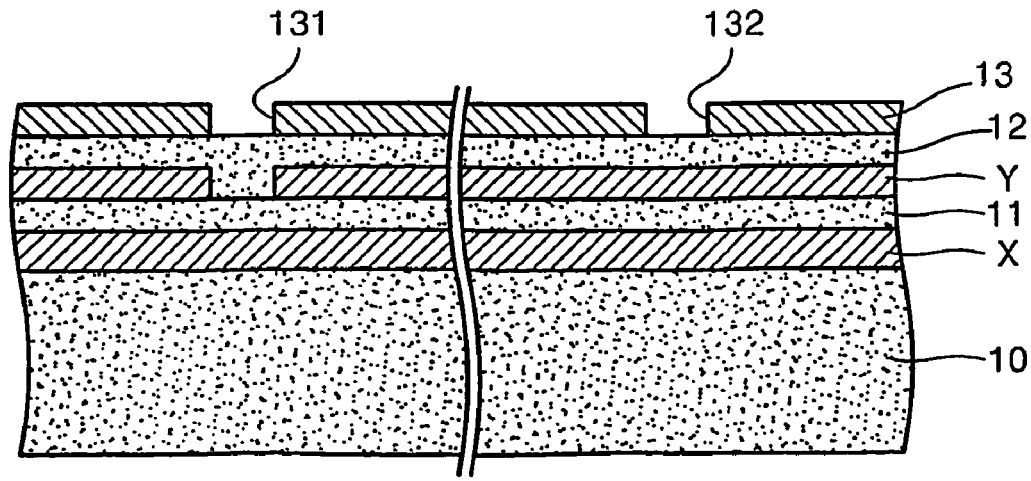

As shown in FIG. 12C, a second insulating layer 12 is formed on a second electrode Y. Next, a lower magnetic film, that is, a magnetic shield layer 13, is formed on the second insulating layer 12. At this time, through holes 131 and 132 for allowing the magnetic producing unit to contact the first and second electrode X and Y and preventing short circuit is formed in the magnetic shield layer 13. If the magnetic shield layer 13 is formed of an electrical insulating material, the through holes 131 and 132 are not needed.

Figure 12D:
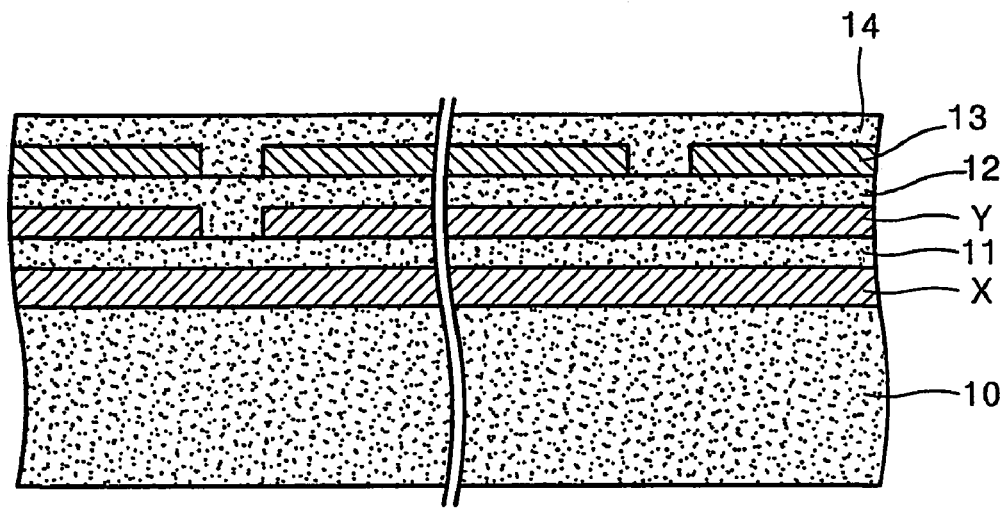

As shown in FIG. 12D, a third insulating film 14 is formed on the magnetic shield layer 13.

Figure 12E:
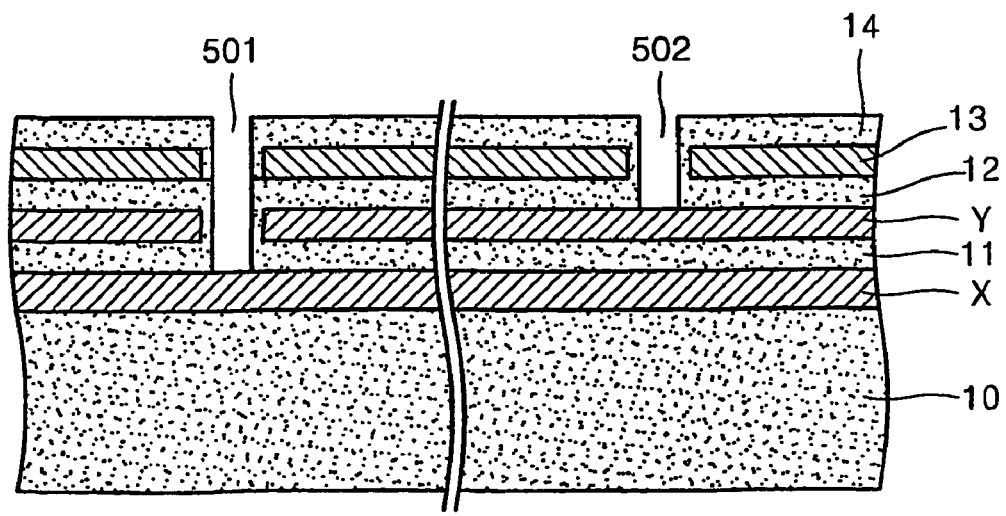

As shown in FIG. 12E, through holes 501 and 502 are vertically formed from the third insulating film 14. The through hole 501 is connected to the through hole 131 of the magnetic shield layer 13, and the through hole Y1, such that the surface of the first electrode X is exposed. At this time, the magnetic shield layer 31 and the second electrode Y must not be exposed through the inner walls of the through hole 501. Meanwhile, the through hole 502 is formed upon the upper surface of the second electrode Y through the central area of the through hole 132 in the magnetic shield layer 13.

Figure 12F:
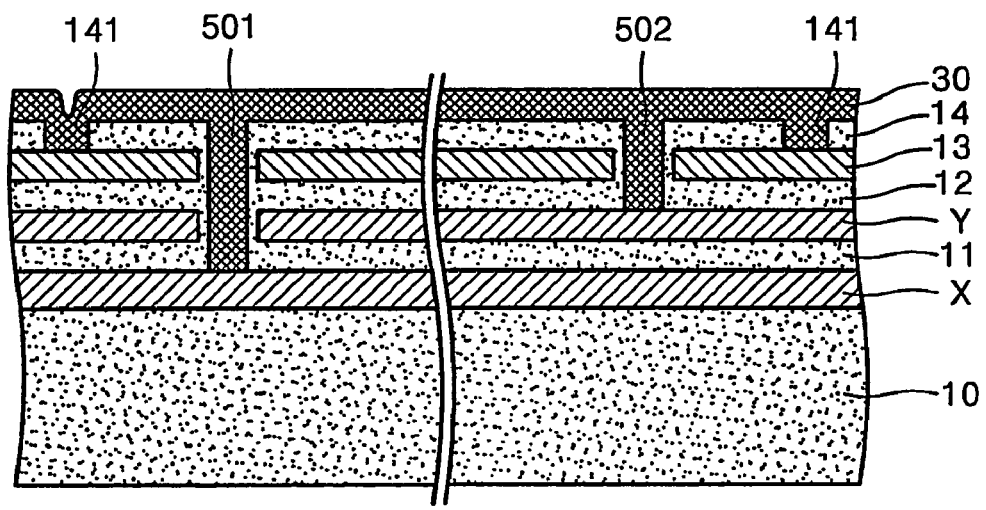

As shown in FIG. 12F, a metal layer 30 for pixel electrodes is formed on the third insulating layer 14, and it contacts the first and second electrodes X and Y through the through holes 501 and 502.

Figure 12G:
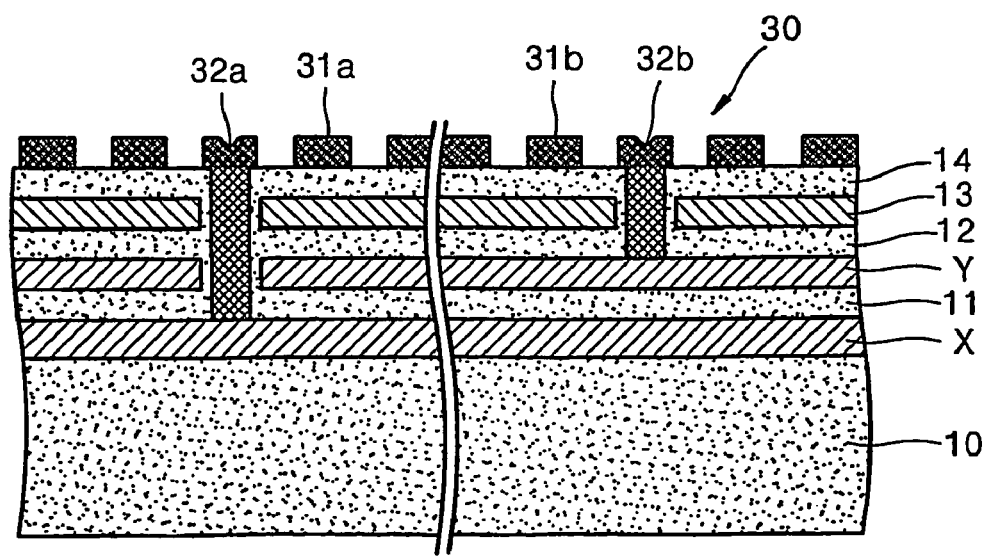

As shown in FIG. 12G, the metal layer 30 is patterned to obtain the aforementioned magnetic field producing units 31a and 31b by photolithography and etching.

Figure 12H:
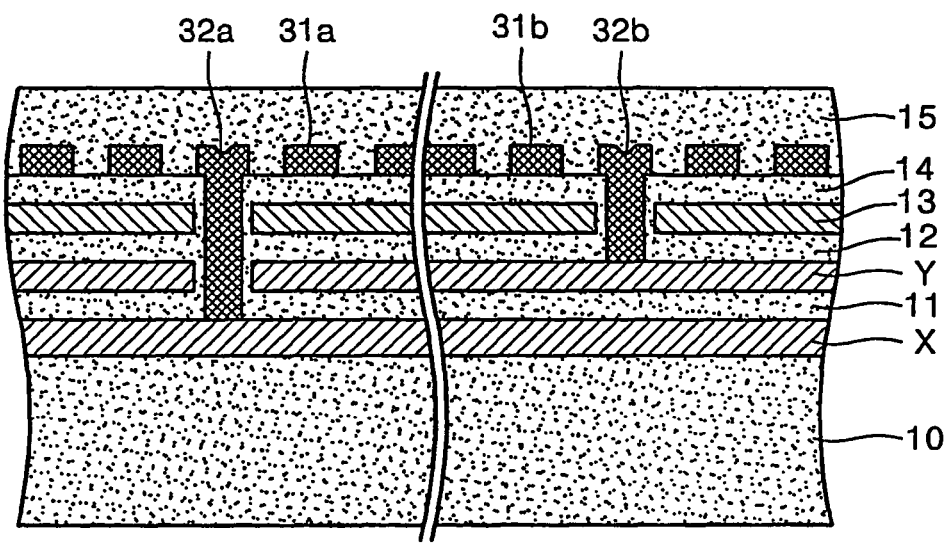
Figure 12I:
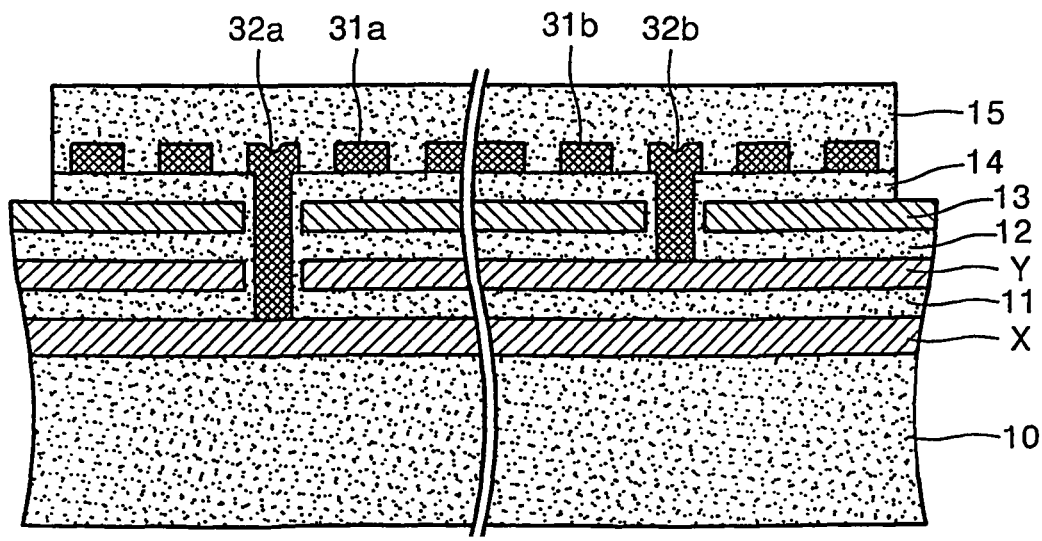

As shown in FIG. 12H, a fourth insulating layer 15 is formed on the third insulating layer 14 and the magnetic field producing units 31a and 31b. Thereafter, the surface of the fourth insulating layer 15 is planarized by chemical mechanical polishing.

As shown in FIG. 12L, a predetermined portion of the fourth insulating layer 15 is removed so that an upper magnetic film 16 to be formed later contacts the magnetic shield layer 13.

Figure 12J:
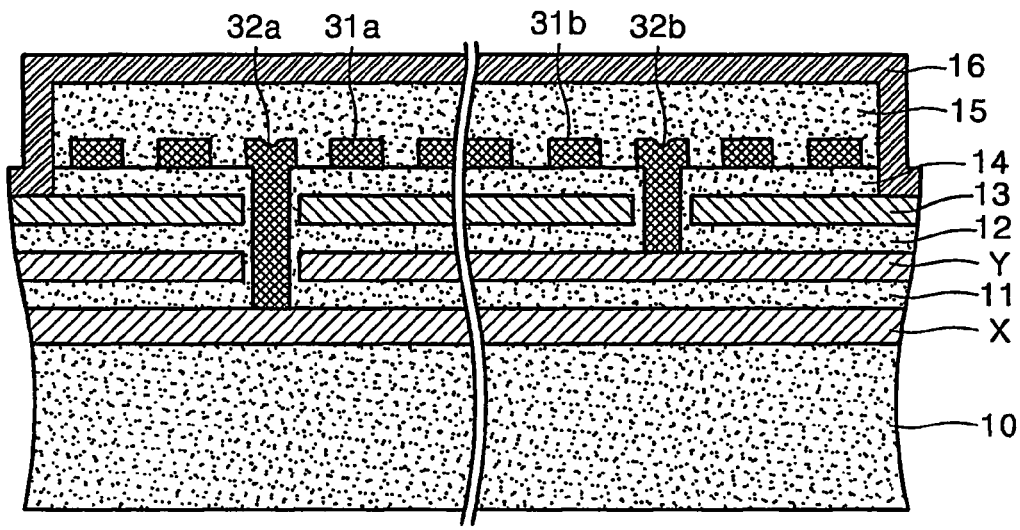

As shown in FIG. 12J, the upper magnetic film 16 is deposited on the fourth insulating layer 15.

Figure 12K:
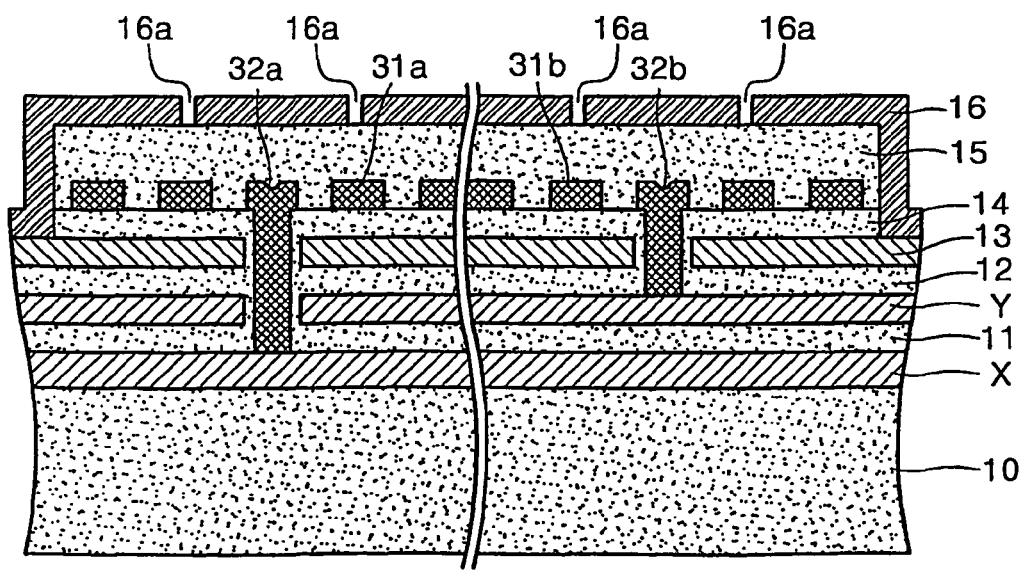

As shown in FIG. 12K, the aforementioned magnetic gaps 16a are formed on predetermined areas on the upper surface of the upper magnetic film 16.

Through such a process, the stacked structure on the rear plate 10 according to the first embodiment of the present invention is formed.

The stacked structure on the rear plate 10 according to the second embodiment can be obtained by an additional process. Such rear plates having stacked structures are each combined with a pre-fabricated front plate 20 at a predetermined distance, thereby obtaining a magnetic display panel according to the present invention.

INDUSTRIAL APPLICABILITY

The above-described display panel according to the present invention can provide moving pictures because of its responsivity better than that of a reflective display panel, and, particularly, is easily fabricated at a low cost in large quantities because of its simple structure. Furthermore, such a display panel is advantageous in constituting super-large display devices based on multiple integration.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A magnetic display panel comprising:
   front and rear plates at a predetermined distance from each other;
   strips of first electrodes arranged in the first direction on an inner surface of the rear plate;
   strips of second electrodes arranged in a direction perpendicular to the first electrodes and insulated from the first electrodes;
   a plurality of pixel electrodes, each pixel electrode being installed on a respective intersection of a first electrode and a second electrode, the pixel electrodes each having a spiral magnetic field producing unit electrically connected to the first and second electrodes;
   an upper magnetic film on the pixel electrodes, the upper magnetic film having a magnetic gap through which a magnetic field produced by the pixel electrodes leaks; and
   a magnetic fluid in a predetermined thickness on the inner surface of the rear plate.

2. The magnetic display panel of claim 1, wherein the upper magnetic film is a soft magnetic material.

3. The magnetic display panel of claim 1, wherein each of the pixel electrodes has a plurality of magnetic field producing units electrically connected to one another.

4. The magnetic display panel of claim 1, including two magnetic gaps for each magnetic field producing unit in the upper magnetic film, and each of the magnetic gaps is halfway between the center of a magnetic field producing unit and a lateral side of the magnetic field producing unit.

5. The magnetic display panel of claim 1, including a magnetic shield layer, which corresponds to a lower magnetic film, of a magnetic material, under the pixel electrodes.

6. The magnetic display panel of claim 4, including a magnetic shield layer, which corresponds to a lower magnetic film, of a magnetic material, under the pixel electrodes.

7. The magnetic display panel of claim 5, wherein the magnetic shield layer and the upper magnetic film form a closed-loop-shaped magnetic circuit.

8. The magnetic display panel of claim 6, wherein the magnetic shield layer and the upper magnetic film form a closed-loop-shaped magnetic circuit.

9. A magnetic display panel comprising:
   front and rear plates having a predetermined distance from each other;
   strips of first electrodes arranged in a first direction on an inner surface of the rear plate;
   strips of second electrodes arranged in a direction perpendicular to the first electrodes and insulated from the first electrodes;
   a plurality of pixel electrodes, each pixel electrode being installed on a respective intersection of a first electrode and a second electrode, the pixel electrodes each having a spiral magnetic field producing unit electrically connected to the first and second electrodes;
   a lower magnetic film on the pixel electrodes, the lower magnetic film having a magnetic gap through which a magnetic field produced by the pixel electrodes leaks;
   an upper magnetic film opposite the lower magnetic film; and
   a magnetic fluid in a predetermined thickness on the inner surface of the rear plate.

10. The magnetic display panel of claim 9, wherein the upper and lower magnetic films are a soft magnetic material.

11. The magnetic display panel of claim 9, wherein each of the pixel electrodes has a plurality of magnetic field producing units electrically connected to one another.

12. The magnetic display panel of claim 9, including two magnetic gaps for each magnetic field producing unit in the upper magnetic film, and each of the magnetic gaps is halfway between the center of a magnetic field producing unit and a lateral side of the magnetic field producing unit.

13. The magnetic display panel of claim 9, including a magnetic shield layer of a ferromagnetic material, under the pixel electrodes.

14. The magnetic display panel of claim 12, including a magnetic shield layer of a ferromagnetic material, under the pixel electrodes.

15. The magnetic display panel of claim 13, wherein the magnetic shield layer and the upper magnetic film form a closed-loop-shaped magnetic circuit.

16. The magnetic display panel of claim 14, wherein the magnetic shield layer and the upper magnetic film form a closed-loop-shaped magnetic circuit.

* * * * *